(12) United States Patent
Van Buskirk

(10) Patent No.: US 11,359,652 B2
(45) Date of Patent: Jun. 14, 2022

(54) ORIFICE PLATES

(71) Applicant: Paul Van Buskirk, Crosby, TX (US)

(72) Inventor: Paul Van Buskirk, Crosby, TX (US)

( * ) Notice: Subject to any disclaimer, the term of this patent is extended or adjusted under 35 U.S.C. 154(b) by 0 days.

(21) Appl. No.: 16/814,962

(22) Filed: Mar. 10, 2020

(65) Prior Publication Data
US 2021/0285472 A1    Sep. 16, 2021

(51) Int. Cl.
*F15D 1/02* (2006.01)
*F16L 55/027* (2006.01)

(52) U.S. Cl.
CPC ........ *F15D 1/025* (2013.01); *F16L 55/02718* (2013.01)

(58) Field of Classification Search
CPC .............................. F15D 1/25; F16L 55/02718
USPC .......................................................... 138/40
See application file for complete search history.

(56) References Cited

U.S. PATENT DOCUMENTS

| | | | | |
|---|---|---|---|---|
| 2,169,359 A | * | 8/1939 | Jones | F24D 19/0002 |
| | | | | 181/233 |
| 2,390,320 A | * | 12/1945 | Overbeke | F16L 55/052 |
| | | | | 138/30 |
| 2,688,985 A | * | 9/1954 | Holdenried | G01F 1/42 |
| | | | | 138/37 |
| 2,825,203 A | * | 3/1958 | Bertin | F02K 7/067 |
| | | | | 60/249 |
| 3,545,492 A | | 12/1970 | Scheid, Jr. | |
| 3,702,144 A | * | 11/1972 | Loveland | F16K 47/10 |
| | | | | 138/44 |
| 3,878,870 A | | 4/1975 | Atherton et al. | |
| 4,130,173 A | * | 12/1978 | Cooksey | F01N 1/083 |
| | | | | 138/37 |
| 5,341,848 A | | 8/1994 | Laws | |
| 5,495,872 A | * | 3/1996 | Gallagher | F15D 1/025 |
| | | | | 138/40 |
| 5,918,637 A | | 7/1999 | Flelschman | |
| 7,051,765 B1 | | 5/2006 | Kelley et al. | |
| 7,621,670 B1 | | 11/2009 | England | |

(Continued)

FOREIGN PATENT DOCUMENTS

IN    653/MUMNP/2010    8/2010
WO         2015048043 A3    4/2015

OTHER PUBLICATIONS

Paul D. Van Buskirk, "Thermodynamic and Transport Analyses of a Bernoulli Flow Meter system for Any Real Fluid", [dated Apr. 2006], [retrieved on Nov. 23, 2014]. Retrieved from the Internet <URL: http://www.aplusflowtek.com/_papers/PTK-8-3_R1.pdf>.

*Primary Examiner* — Craig M Schneider
*Assistant Examiner* — David R Deal
(74) *Attorney, Agent, or Firm* — Asgaard Patent Services, LLC; F. Wayne Thompson, Jr.

(57) ABSTRACT

Implementations of an orifice plate configured to regulate a fluid flow are provided. An example orifice plate is configured to be positioned in a conduit and comprises a plurality of holes that extend therethrough. The plurality of holes are arranged to form one or more spiral layouts configured to regulate a fluid flow passing therethrough. Each spiral layout is a logarithmic spiral. In some implementations, each spiral layout has a growth factor of substantially 1.618 for each quarter turn. In some implementations, each hole in an orifice plate has a contoured conical shape extending between an inlet and an outlet, the inlet is larger in diameter than the outlet.

18 Claims, 7 Drawing Sheets

(56) References Cited

U.S. PATENT DOCUMENTS

| | | | | |
|---|---|---|---|---|
| 8,245,727 | B2* | 8/2012 | Mooney | F16K 7/14 |
| | | | | 137/625.33 |
| 9,200,650 | B2 | 12/2015 | Van Buskirk | |
| 9,410,565 | B2 | 8/2016 | Van Buskirk | |
| 10,378,566 | B2* | 8/2019 | Kumar | F15D 1/025 |
| 2006/0278289 | A1* | 12/2006 | Robinson | E03F 5/0404 |
| | | | | 138/40 |
| 2010/0071793 | A1* | 3/2010 | Warnica | F15D 1/08 |
| | | | | 138/39 |
| 2014/0096854 | A1* | 4/2014 | Harman | F16L 9/00 |
| | | | | 138/40 |
| 2015/0083262 | A1 | 3/2015 | Van Buskirk | |
| 2016/0076565 | A1 | 3/2016 | Van Buskirk | |
| 2018/0295800 | A1* | 10/2018 | Kiernan | A01G 31/06 |
| 2020/0080576 | A1* | 3/2020 | Whynall | F15D 1/025 |

\* cited by examiner

ORIFICE PLATES

TECHNICAL FIELD

This disclosure relates to implementations of an orifice plate configured to regulate a fluid flow. In particular, the present disclosure is directed to implementations of an orifice plate comprising a plurality of holes positioned to form one or more spiral arrangements.

BACKGROUND

U.S. Pat. No. 7,051,765, which is incorporated herein by reference in its entirety, discloses an orifice plate for use in a conduit through which fluid flows.

As disclosed in the '765 patent, in general, the variation of a process variable across an orifice plate's surface introduces inefficiencies in a fluid flow. For example, prior art orifice plates generally experience fairly large pressure losses as a fluid flows from one side of the plate to the other. Unfortunately, to handle such large pressure losses, larger and more expensive fluid pumps are used. Also, pressure potential in prior art orifice plates is generally consumed by eddy turbulence that is random and chaotic. These eddy formations about the orifice plate reduce linearity and repeatability of any process variable measurements, thereby causing a reduction in measurement accuracy. Reduced measurement accuracy leads to processes that are highly variable which, in turn, increases process costs due to greater equipment operational margins that must be maintained. If pressure can be equalized or balanced across the surface area of an orifice plate, the random and chaotic eddy formations may be greatly reduced. Thus, by balancing the flow with respect to the measured process variable, the accuracy of process variable measurement may be improved and the cost of taking such measurements may be reduced.

An orifice plate according to the '765 patent addresses these issues. More particularly, an orifice plate according to the '765 patent may balance one or more process variables associated with a fluid flow passing through the orifice plate. Thus, an orifice plate according to the '765 patent may improve repeatability, linearity, and reduction of pressure loss.

However, the '765 patent does not teach how to construct an orifice plate configured to limit pipe and plate noise, erosion, cavitation, shear stress, etc. while maximizing system pressure loss, and limiting flow to required values. Further, the '765 patent does not teach how to manufacture an orifice plate configured to optimize process variable measurements, minimize system pressure drop, recover pressure, recover energy, and reduce noise and other inefficiencies within a system using an orifice plate comprising a plurality of holes positioned to form one or more spiral layouts. Each spiral layout consisting of a series of holes arranged to form a spiral.

Accordingly, it can be seen that needs exist for the orifice plates disclosed herein. It is to the provision of one or more orifice plates configured to address these needs, and others, that the present invention is primarily directed.

SUMMARY OF THE INVENTION

Implementations of an orifice plate configured to regulate a fluid flow are provided. An orifice plate is configured to be positioned in a conduit and extend across a transverse cross-section thereof. The orifice plate comprises a plurality of holes that extend therethrough. The plurality of holes are arranged to form a spiral layout configured to regulate a fluid flow passing therethrough. The spiral layout is a logarithmic spiral. In some implementations, the spiral layout has a growth factor of substantially 1.618 for each quarter turn.

Another example orifice plate comprises a plurality of holes arranged to form three or more spiral layouts. Each spiral layout is a logarithmic spiral. In some implementations, each spiral layout has a growth factor of substantially 1.618 for each quarter turn.

Each hole of an office plate includes an inlet and an outlet. In some implementations, each hole has a contoured conical shape extending between an inlet and an outlet, the inlet is larger in diameter than the outlet. Each hole has a linear radius having a constant growth factor. In some implementations, the linear radius has a constant growth factor of substantially 1.618.

BRIEF DESCRIPTION OF THE DRAWINGS

Like reference numerals refer to corresponding parts throughout the several views of the drawings.

DETAILED DESCRIPTION

Implementations of an orifice plate configured to regulate a fluid flow are provided. As used herein, the term "orifice plate" refers to any structural element (e.g., a plate, a disk, etc.) having a hole pattern formed therethrough that is adapted to be installed in a fluid flow such that the fluid passes through the orifice plate's hole pattern. The hole pattern of an orifice plate, according to the present disclosure, comprises a plurality of holes arranged to form one or more spiral layouts. The hole pattern of an orifice plate can be configured to, for example, improve process variable measurement(s), minimize system pressure drop, maximize system pressure drop, recover pressure, recover energy, reduce noise and other inefficiencies within the system, or a combination thereof. In this way, as non-limiting examples, an orifice plate can be configured for use as a restriction orifice plate, a flow conditioning plate, a flow measurement plate, a flow silencing plate, or a suitable combination thereof.

An orifice plate according to the present invention can be secured between two flanges of a conduit (e.g., a pipe). In this way, the orifice plate secured between the flanges can be used to regulate (e.g., condition) the fluid flow passing through the conduit. Such conduits, and the joining thereof, are well known to those of ordinary skill in the art and are not limitations of the present invention.

Figure 1A:
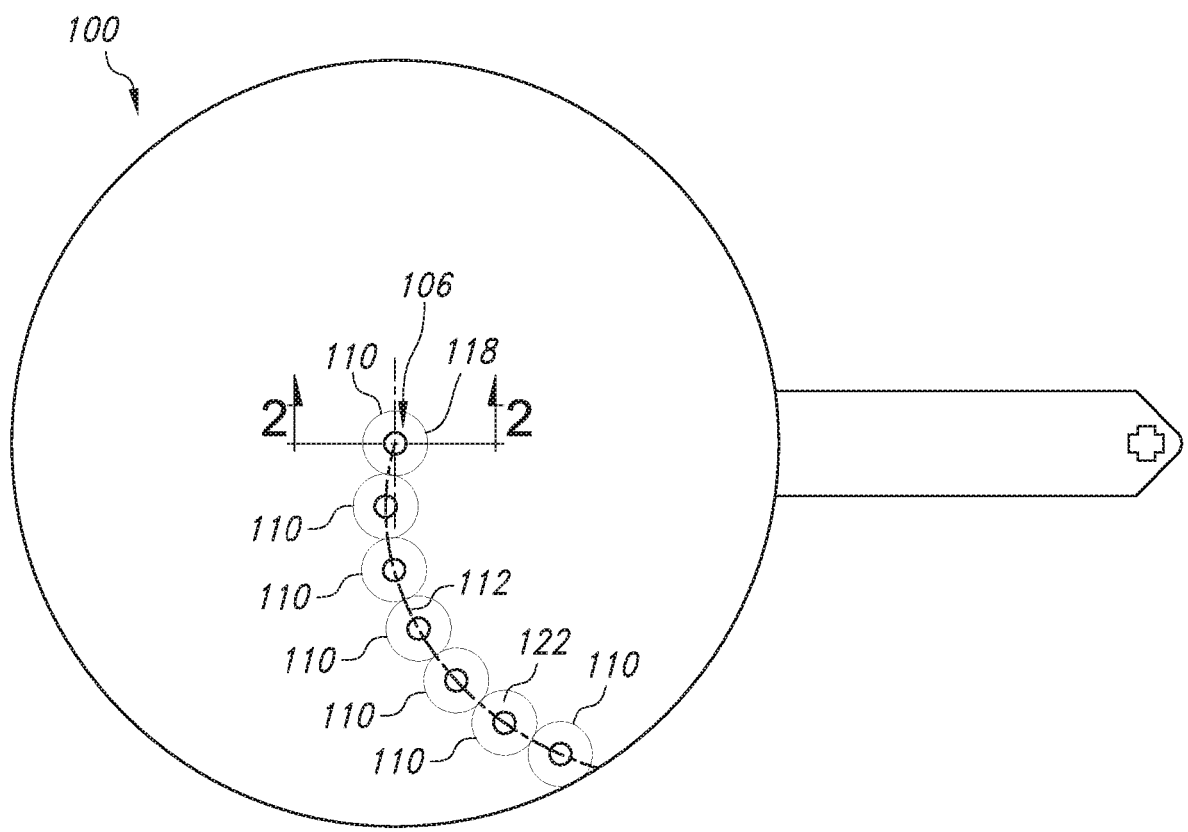
FIG. 1A illustrates an example orifice plate configured according to the principles of the present disclosure.

An orifice plate can be sized and/or shaped to work with any size and/or shape of conduit. For example, as shown in FIG. 1A, an orifice plate 100 can be circular for installation in a cylindrical conduit. In some implementations, an orifice plate includes a peripheral mounting region that is captured between flanges of a conduit.

FIGS. 1A-1C, 3A-3B, and 4 illustrate example implementations of an orifice plate according to the present disclosure.

Figure 1B:
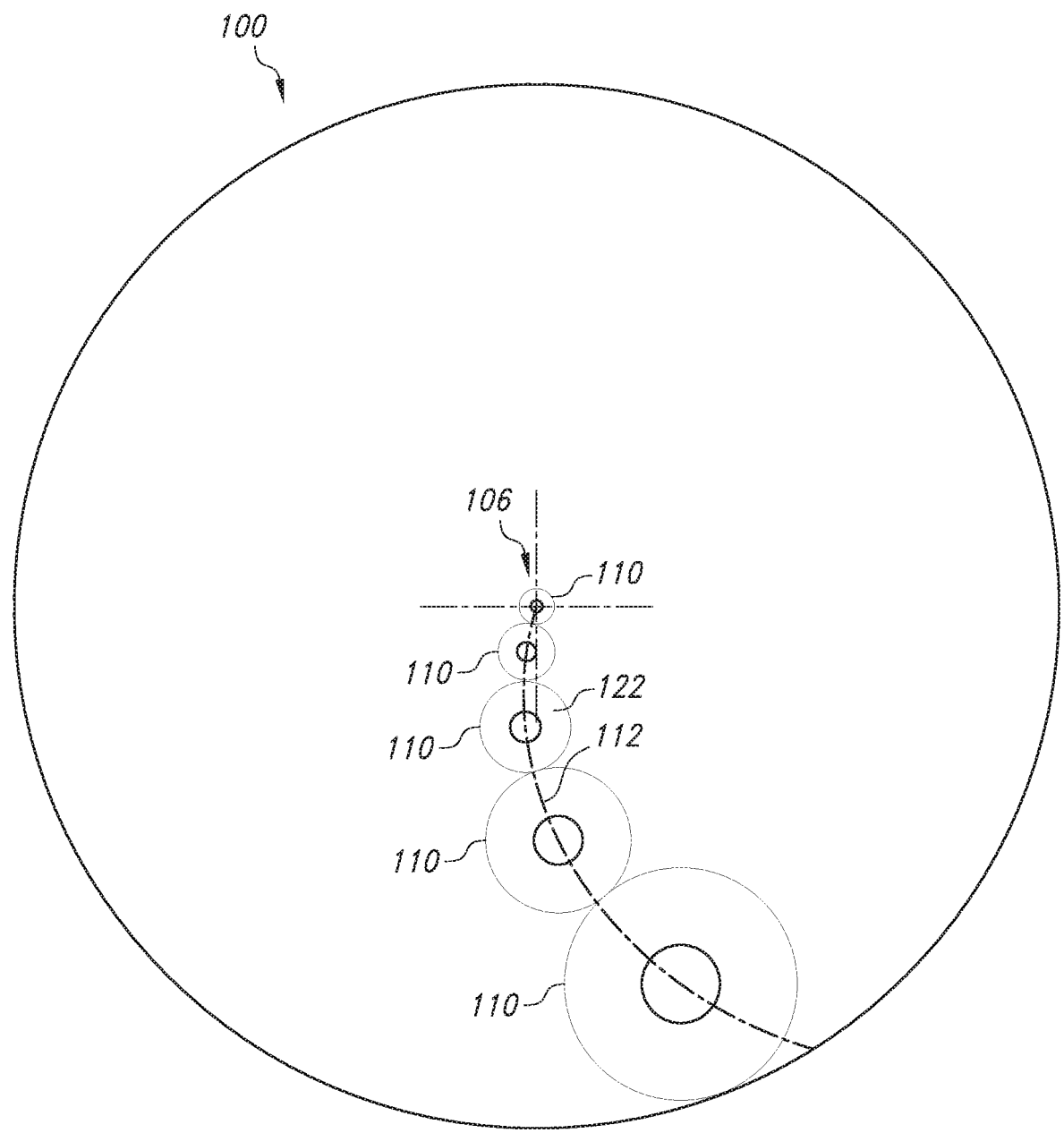
FIG. 1B illustrates another example orifice plate configured according to the principles of the present disclosure.
Figure 1C:
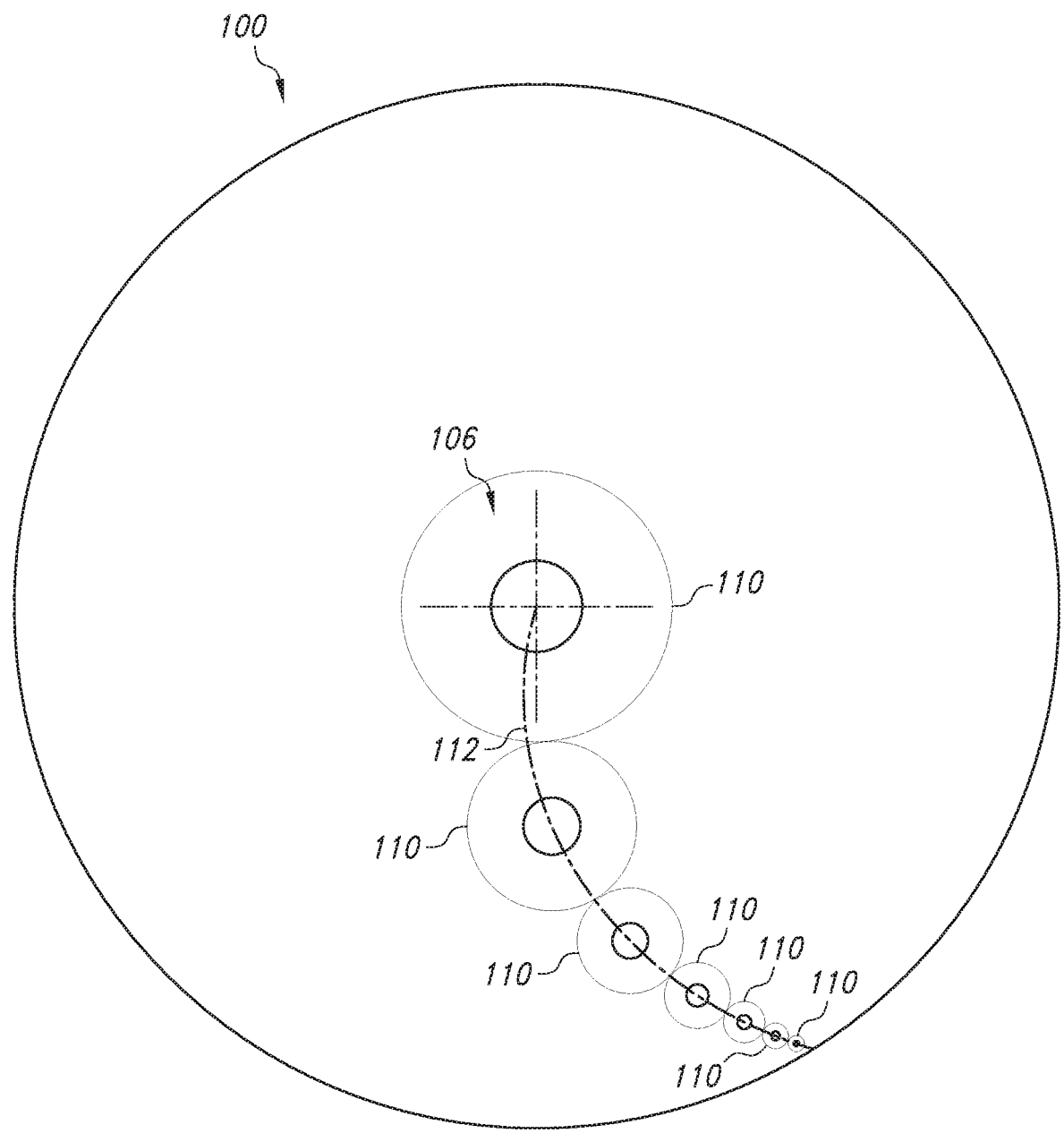
FIG. 1C illustrates yet another example orifice plate configured according to the principles of the present disclosure.

As shown in FIGS. 1A-1C, in some implementations, an orifice plate 100 is configured to be positioned in a conduit and extend across a transverse cross-section thereof. The orifice plate 100 comprises a plurality of holes 110 that extend therethrough. The plurality of holes 110 are distributed along an imaginary spiral 112 defined by dashed lines to form a spiral layout 122. The spiral layout 122 consists of a series of holes 110, the imaginary spiral 112 passing through the center of each hole 110. In some implementations, the imaginary spiral 112, and thereby the spiral layout 122, is a logarithmic spiral having a growth factor of φ (i.e., the golden ratio), or substantially 1.618 for every quarter turn (i.e., the imaginary spiral 112 gets wider by a factor of φ, or substantially 1.618, for every quarter turn).

As shown in FIGS. 1A-1C, each hole 110 in the orifice plate 100 is circular. In some implementations, each hole 110 of an orifice plate 100 may be another shape (e.g., an arc-shaped slot, a V-shaped hole, etc.). The shape of each hole 110 formed in an orifice plate 100 depends on the properties (e.g., density, viscosity, shear stress limits, pressure pulse limits, etc.) of the fluid flow (e.g., gas, liquid, solid, or a combination thereof) that the orifice plate 100 is configured to regulate.

As shown in FIGS. 1A-1C, the spiral layout 122 extends from a central circular region 106 of the orifice plate 100. In some implementations, a first hole 110 of the spiral layout 122 extends through the central circular region 106 of the orifice plate 100, each subsequent hole 110 is positioned adjacent the preceding hole 110 to form the spiral layout 122. In some implementations, there may be no hole extending through the central circular region 106 of an orifice plate 100 (not shown).

As shown in FIG. 1A, in some implementations, the plurality of holes 110 that form the spiral layout 122 each have an equivalent diameter.

As shown in FIGS. 1B and 1C, in some implementations, the plurality of holes 110 that form the spiral layout 122 each have a different diameter.

As shown in FIG. 1B, in some implementations, the first hole 110 of the spiral layout 122 has the smallest diameter and each subsequent hole 110 distributed along the imaginary spiral 112 has a larger diameter than the preceding hole 110 (see e.g., FIG. 1B). In this way, the orifice plate 100 is configured to force a fluid flow towards the outside of the conduit as it passes through the plurality of holes 110. In some implementations, the diameter of each hole 110, subsequent to the first hole 110, increases by a factor of φ (i.e., the golden ratio), or substantially 1.618 (i.e., the diameter of each subsequent hole 110 is larger, by a factor of ~1.618, than is the preceding hole 110).

As shown in FIG. 1C, in some implementations, the first hole 110 of the spiral layout 122 has the largest diameter and each subsequent hole 110 distributed along the imaginary spiral 112 has a smaller diameter than the preceding hole 110 (see, e.g., FIG. 1C). In this way, the orifice plate 100 is configured to force a fluid flow towards the center of the conduit as it passes through the plurality of holes 110. In some implementations, the diameter of each hole 110, subsequent to the first hole 110, decreases by a factor of φ (i.e., the golden ratio), or substantially 1.618 (i.e., the diameter of each subsequent hole 110 is smaller, by a factor of ~1.618, than is the preceding hole 110).

Figure 2:
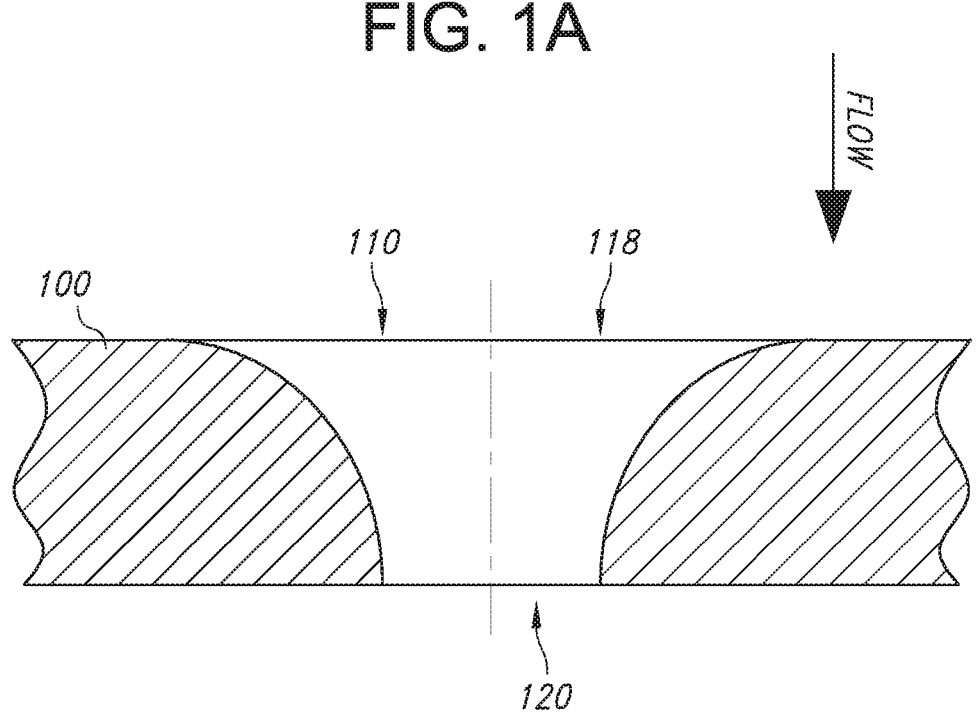
FIG. 2 illustrates a cross-sectional view of the orifice plate shown in FIG. 1A, taken along line 2-2.

As shown in FIG. 2, each hole 110 of an orifice plate 100 includes an inlet 118 and an outlet 120. In some implementations, each hole 110 has a contoured conical shape wherein the inlet 118 has a larger diameter than the outlet 120. This conical shape of each hole 110 is used to optimize performance of an orifice plate 100 for use with a variety of single-phase fluids, multi-phase fluids, or a combination thereof. In some implementations, the contoured conical shape of each hole 110 has a radius (e.g., a linear radius as shown in FIG. 2). In some implementations, the linear radius of the hole 110 has a constant growth factor of φ (i.e., the golden ratio), or substantially 1.618. In some implementations, the contoured conical shape of the hole 110 shown in FIG. 2 has been tested and shown to provide a discharge coefficient of 0.96 or higher.

As shown in FIGS. 1A-1C, in some implementations, the inlets 118 of adjacent holes 110 may touch, but do not overlap. In practice, due to manufacturing considerations, the inlets 118 of adjacent holes 110 are 0.03", or further, apart. In some implementations, the inlets 118 of two or more adjacent holes 110 may overlap (see, e.g., FIG. 3B). Because fluid flow symmetry is maintained by the spiral layout(s), the overlap of two or more adjacent inlets does not affect the performance of an orifice plate configured according to the principles of the present disclosure.

Figure 3A:
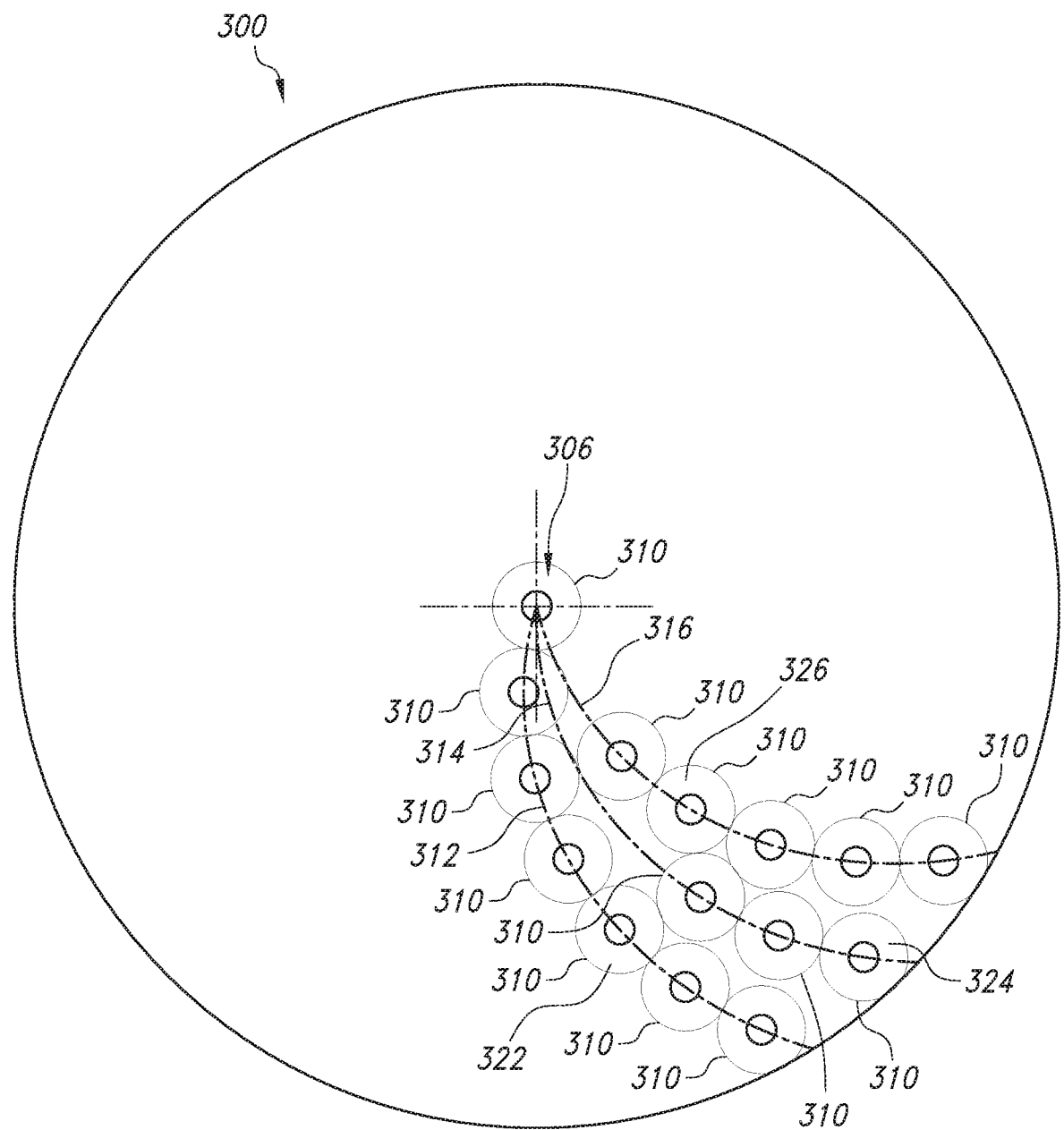
FIGS. 3A-3B illustrate other example orifice plates configured according to the principles of the present disclosure.
Figure 3B:
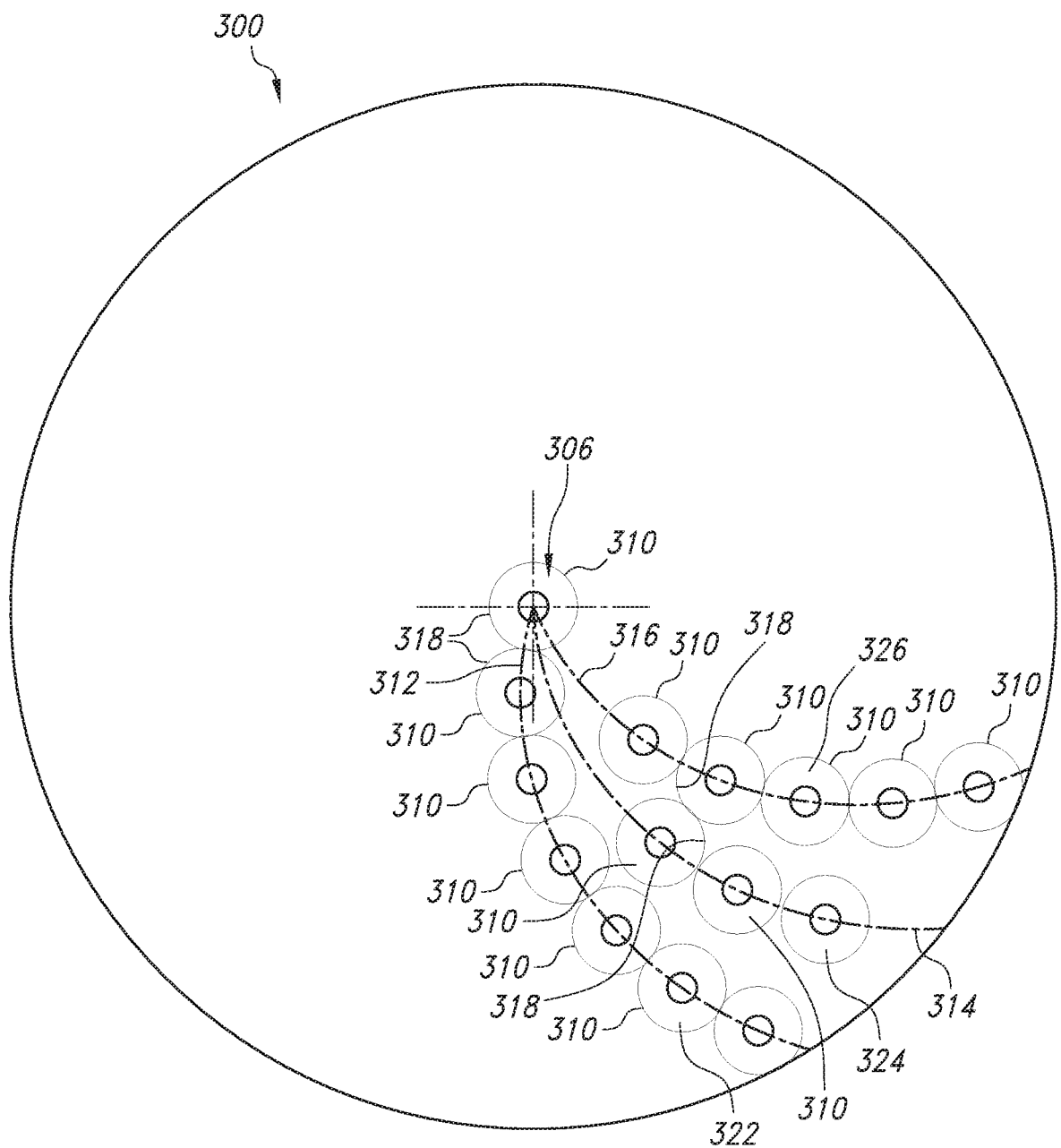

FIGS. 3A and 3B illustrate other example implementations of an orifice plate 300 according to the present disclosure. In some implementations, the orifice plate 300 is similar to the orifice plates 100 discussed above, in particular the orifice plate 100 shown in FIG. 1A, but the plurality of holes 310 are arranged to form three spiral layouts 322, 324, 326. Each spiral layout 322, 324, 326 consists of a series of holes 310 arranged to form a spiral shape.

As shown in FIGS. 3A and 3B, in some implementations, the plurality of holes 310 in the orifice plate 300 are distributed along three imaginary spirals 312, 314, 316 defined by dashed lines to form three spiral layouts 322, 324, 326. Each of the imaginary spirals 312, 314, 316, and thereby each spiral layout, may be a logarithmic spiral having a growth factor of φ (i.e., the golden ratio), or substantially 1.618 for every quarter turn (i.e., each imaginary spiral 312, 314, 316 gets wider by a factor of 1.618 for every quarter turn).

As shown in FIGS. 3A and 3B, each imaginary spiral 312, 314, 316, and its associated spiral layout, emanate from a central circular region 306 of the orifice plate 300. The first imaginary spiral 312 passes through the center of each hole 310 that makes up the first spiral layout 322, the second imaginary spiral 314 passes through the center of each hole 310 that makes up the second spiral layout 324, and the third imaginary spiral 316 passes through the center of each hole 310 that makes up the third spiral layout 326.

As shown in FIGS. 3A and 3B, in some implementations, a first hole 310 of the first spiral layout 322 extends through the central circular region 306 of the orifice plate 300, each subsequent hole 310 is positioned adjacent the preceding hole 310 to form the spiral layout 322; a first hole of the second spiral layout 324 is offset from the central circular region 306, each subsequent hole 310 is positioned adjacent the preceding hole 310 to form the spiral layout 324; and a first hole of the third spiral layout 326 is offset from the central circular region 306, each subsequent hole 310 is positioned adjacent the preceding hole 310 to form the spiral layout 326.

As shown in FIGS. 3A and 3B, the plurality of holes 310 arranged to form the spiral layouts 322, 324, 326 each have an equivalent diameter. In some implementations, one or more of the holes 310 may have a different diameter (not shown).

As described above in connection with the hole 110 shown in FIG. 2, each hole 310 in an orifice plate 300 may have a contoured conical shape. In some implementations, the contoured conical shape of each hole 310 has a radius (e.g., a linear radius as shown in FIG. 2). In some implementations, the linear radius of the hole 310 has a constant growth factor of $\varphi$ (i.e., the golden ratio), or substantially 1.618.

It should be understood that, in some implementations, an orifice plate may have a plurality of holes therein that are arranged into more than three spiral layouts 322, 324, 326. In general, the number of holes in an orifice plate, the number of spiral layouts, and the distribution of holes forming each spiral layout depends on how a flow profile needs to look after it exits (or passes through) the orifice plate. If an orifice plate is to be manufactured with more than three spiral layouts, the number of spiral layouts may be a Fibonacci number (e.g., 5, 8, 13, 21, 34, etc.).

Figure 4:
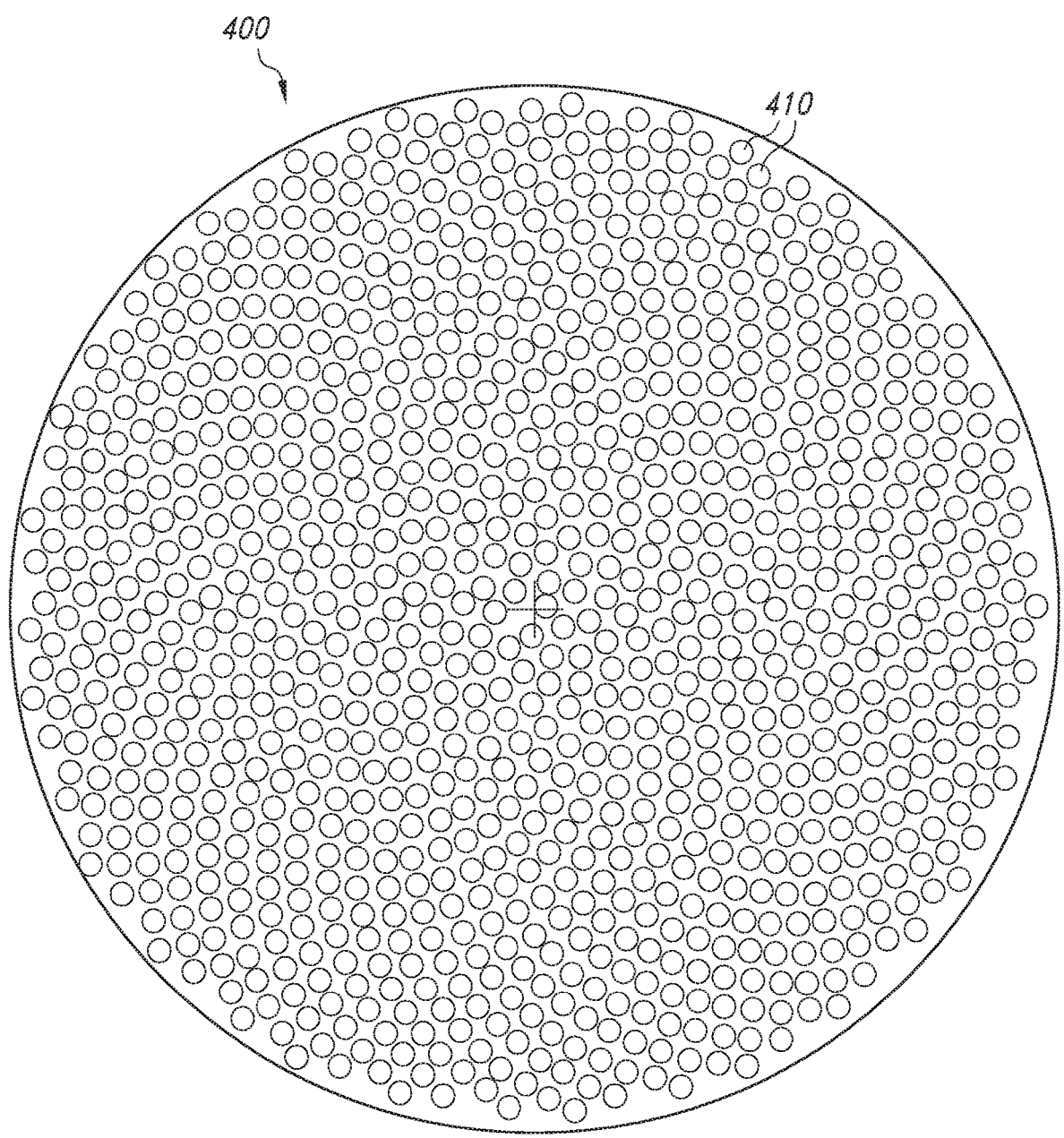
FIG. 4 illustrates still yet another example orifice plate configured according to the principles of the present disclosure.
Figure 5A:
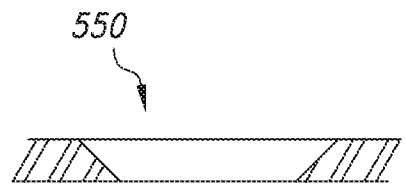
FIGS. 5A-5E illustrate example inlet and/or outlet shapes.
Figure 5B:
Figure 5C:
Figure 5D:
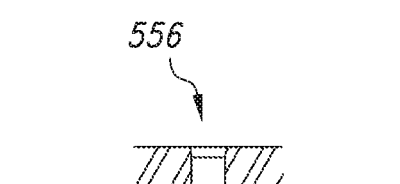
Figure 5E:
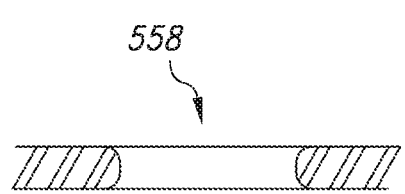

FIG. 4 illustrates another example implementation of an orifice plate 400 according to the present disclosure. In some implementations, the orifice plate 400 is similar to the orifice plates 100, 300 discussed above but the plurality of holes 410 are arranged to form a criss-crossing pattern of spiral layouts (e.g., a phyllotactic pattern). The number of clockwise spiral layouts is a Fibonacci number and the number of counter-clockwise spiral layouts is a Fibonacci number. In some implementations, the hole pattern of the orifice plate 400 is configured to maximize the number of holes therein.

An orifice plate Beta Ratio ($\beta$) is the ratio of the combined inside diameters (d) of the holes (e.g., holes 110, 310, 410) in an orifice plate (e.g., orifice plates 100, 300, 400) to the inside diameter of a conduit (D) (i.e., $\beta=d/D$). Typically, the orifice plate Beta Ratio ($\beta$) ranges between 0.05 to 0.95. In some implementations, an orifice plate's (e.g., orifice plate 100, 300, 400) efficiency is limited by the orifice plate Beta Ratio ($\beta$). Thus, when an orifice plate is being fabricated, the hole layout may be tied to a desired orifice plate Beta Ratio ($\beta$). Or, put another way, a desired orifice plate Beta Ratio ($\beta$) may be used to determine the number and diameter of the holes put in an orifice plate. A desired orifice plate Beta Ratio ($\beta$) being a function of end use (i.e., the conduit in which the orifice plate is to be positioned and the fluid flow it is being configured to regulate). Therefore, in some implementations, it may be desirable to configure an orifice plate to maximize the Beta Ratio ($\beta$) (see, e.g., the orifice plate 400 shown FIG. 4).

As an example, the spacing between the spiral layouts 322, 324, 326 shown in FIG. 3A positions the plurality of holes 310 in the orifice plate 300 to provide a moderate (~0.4) to high Beta Ratio (~0.7). As another example, the spacing between the spiral layouts 322, 324, 326 shown in FIG. 3B positions the plurality of holes 310 in the orifice plate 300 to provide a low (~0.1) to moderate Beta Ratio (~0.4). As yet another example, the criss-crossing pattern of spiral layouts shown in FIG. 4 positions the plurality of holes 410 in the orifice plate to provide a high (~0.7) to very high Beta Ratio (~0.95).

When an orifice plate is being configured (or adapted) for use with a particular conduit and fluid flow, the desired Beta Ratio ($\beta$) and the inside diameter (D) of the conduit may be used to calculate a combined hole diameter (d). This value (d) is equal, or substantially equal, to the sum of the diameters of the holes that should be placed in the orifice plate. A person of ordinary skill in the art, having the benefit of the present disclosure, could use this value (d) to position a plurality of holes, having a combined inside diameter equal to (d), in an orifice plate to form one or more spiral arrangements as described above.

As shown in FIGS. 5A-5E, in some implementations, the inlet and/or the outlet of each hole 110, 310, 410 may be shaped to optimize performance of an orifice plate 100, 300, 400 for use regulating the flow of single-phase and/or multiphase fluids. Example shapes for an inlet and/or an outlet include, but are not limited to, a knife edge 550 (see, e.g., FIG. 5A), a contoured edge 552 (see, e.g., FIG. 5B), a blunt/square edge 554 (see, e.g., FIG. 5C), tapered/beveled edges 556 (see, e.g., FIG. 5D), or bi-directional contoured edges 558 (see, e.g., FIG. 5E).

In some implementations, knife edge 550 inlet and/or outlet shapes have a high k ($>1$). In some implementations, blunt/square edge 554 inlet and/or outlet shapes have a moderate to high k. In some implementations, tapered/beveled edge 556 inlet and/or outlet shapes have a moderate to low k. In some implementations, contoured 552 inlet and/or outlet shapes may have a low to very low k ($\ll 1$). As would be understood by those of ordinary skill in the art, as "k" increases, permanent pressure loss in the system increases.

Orifice plate 100, 300, 400 inlet and/or outlet shapes can affect pressure loss, noise, erosion, cavitation, accuracy of process variable measurement, etc. In some implementations, low k value shapes are preferred for measurement, and high k value shapes are preferred for restriction orifice plates. In some implementations, for systems requiring low noise, cavitation, erosion, etc., moderate k value shapes are preferred.

In some implementations, an orifice plate 100, 300, 400 constructed in accordance with the teachings of the present disclosure may accommodate bi-directional flow within a conduit, pipe, etc. Special calibrations and correction factors may be required to meet specifications. In some implementations, the holes of an orifice plate optimized for bi-directional flow may have bi-directional contoured edges (see, e.g., FIG. 5E). In this way, the holes may be configured to facilitate bi-directional flow.

Reference throughout this specification to "an embodiment" or "implementation" or words of similar import means that a particular described feature, structure, or characteristic is included in at least one embodiment of the present invention. Thus, the phrase "in some implementations" or a phrase of similar import in various places throughout this specification does not necessarily refer to the same embodiment.

Many modifications and other embodiments of the inventions set forth herein will come to mind to one skilled in the art to which these inventions pertain having the benefit of the teachings presented in the foregoing descriptions and the associated drawings.

The described features, structures, or characteristics may be combined in any suitable manner in one or more embodiments. In the above description, numerous specific details are provided for a thorough understanding of embodiments of the invention. One skilled in the relevant art will recognize, however, that embodiments of the invention can be practiced without one or more of the specific details, or with other methods, components, materials, etc. In other instances, well-known structures, materials, or operations may not be shown or described in detail.

While operations are depicted in the drawings in a particular order, this should not be understood as requiring that such operations be performed in the particular order shown or in sequential order, or that all illustrated operations be performed, to achieve desirable results.

The invention claimed is:

1. An orifice plate configured to be positioned in a conduit, the orifice plate comprising:
   a plurality of holes that extend through the orifice plate, the plurality of holes are arranged to form a spiral layout configured to regulate a fluid flow passing therethrough;
   wherein the spiral layout is a logarithmic spiral.

2. The orifice plate of claim 1, wherein the spiral layout has a growth factor of substantially 1.618 for each quarter turn.

3. The orifice plate of claim 1, wherein the spiral layout extends from a center of the orifice plate.

4. The orifice plate of claim 1, wherein each hole of the plurality of holes is a contoured conical shape extending between an inlet and an outlet, the inlet is larger in diameter than the outlet.

5. The orifice plate of claim 4, wherein each hole of the plurality of holes has a linear radius having a constant growth factor.

6. The orifice plate of claim 5, wherein the constant growth factor is substantially 1.618.

7. An orifice plate configured to be positioned in a conduit and extend across a transverse cross-section thereof, the orifice plate comprising:
   a plurality of holes that extend through the orifice plate, the plurality of holes are arranged to form three or more spiral layouts configured to regulate a fluid flow passing therethrough;
   wherein each spiral layout is a logarithmic spiral.

8. The orifice plate of claim 7, wherein each spiral layout has a growth factor of substantially 1.618 for each quarter turn.

9. The orifice plate of claim 7, wherein a first spiral layout extends from a center of the orifice plate, a first hole of the first spiral layout extends through the center of the orifice plate.

10. The orifice plate of claim 7, wherein each hole of the plurality of holes is a contoured conical shape extending between an inlet and an outlet, the inlet is larger in diameter than the outlet.

11. The orifice plate of claim 10, wherein each hole of the plurality of holes has a linear radius having a constant growth factor.

12. The orifice plate of claim 11, wherein the constant growth factor is substantially 1.618.

13. An orifice plate configured to be positioned in a conduit, the orifice plate comprising:
   a plurality of holes that extend through the orifice plate, the plurality of holes are arranged to form a spiral layout configured to regulate a fluid flow passing therethrough;
   wherein each hole of the plurality of holes is a contoured conical shape extending between an inlet and an outlet, the inlet is larger in diameter than the outlet;
   wherein each hole of the plurality of holes has a linear radius having a constant growth factor.

14. The orifice plate of claim 13, wherein the spiral layout is a logarithmic spiral.

15. The orifice plate of claim 13, wherein the constant growth factor is substantially 1.618.

16. An orifice plate configured to be positioned in a conduit and extend across a transverse cross-section thereof, the orifice plate comprising:
   a plurality of holes that extend through the orifice plate, the plurality of holes are arranged to form three or more spiral layouts configured to regulate a fluid flow passing therethrough;
   wherein each hole of the plurality of holes is a contoured conical shape extending between an inlet and an outlet, the inlet is larger in diameter than the outlet;
   wherein each hole of the plurality of holes has a linear radius having a constant growth factor.

17. The orifice plate of claim 16, wherein each spiral layout is a logarithmic spiral.

18. The orifice plate of claim 16, wherein the constant growth factor is substantially 1.618.

* * * * *